J. W. KUNZLER.
METHOD OF CASTING PLATE GLASS AND APPARATUS THEREFOR.
APPLICATION FILED APR. 19, 1917. RENEWED MAR. 25, 1921.
1,396,330. Patented Nov. 8, 1921.
2 SHEETS—SHEET 1.
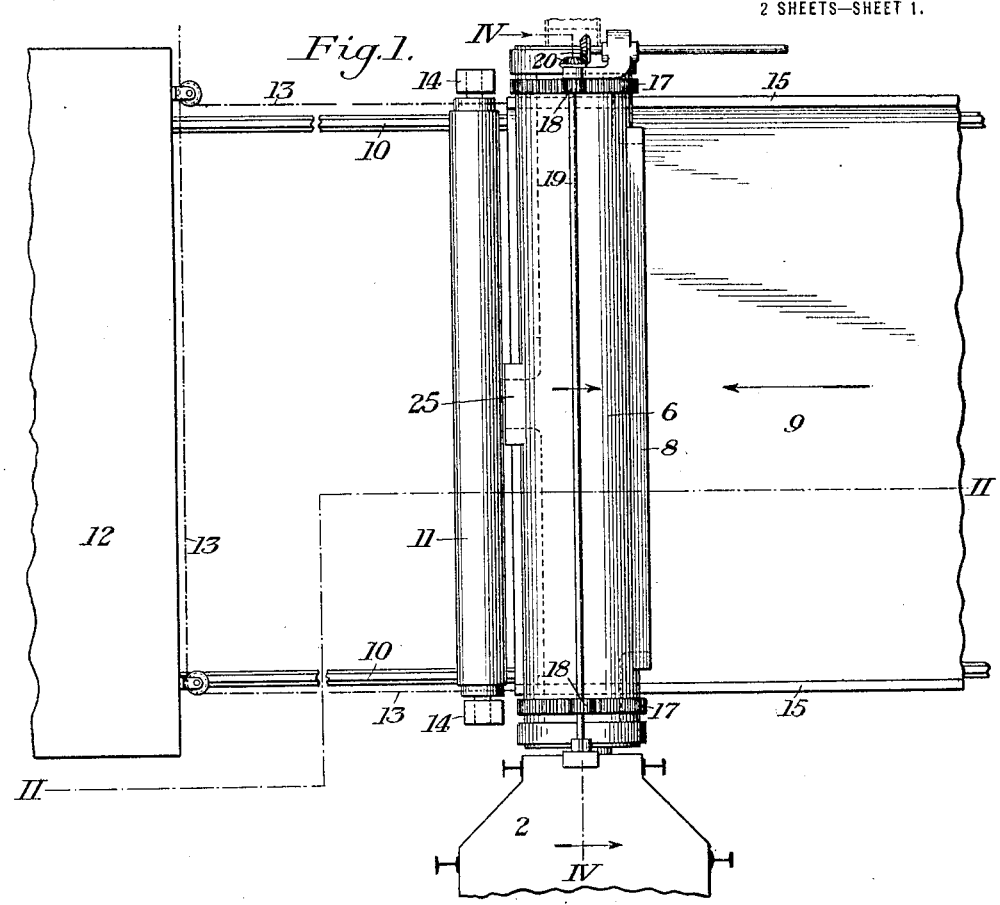
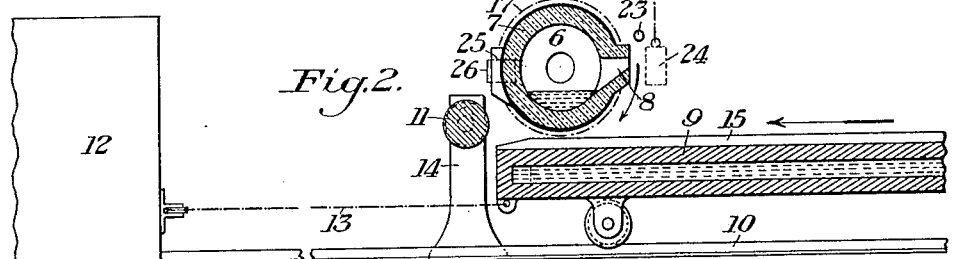
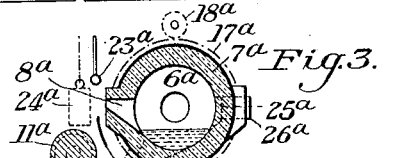
WITNESSES
R. A. Balderson
Geo. B. Bleming
INVENTOR
John W. Kunzler,
by Bakewell, Byrnes & Parmelee,
Attys.

J. W. KUNZLER.
METHOD OF CASTING PLATE GLASS AND APPARATUS THEREFOR.
APPLICATION FILED APR. 19, 1917. RENEWED MAR. 25, 1921.
1,396,330.
Patented Nov. 8, 1921.
2 SHEETS—SHEET 2.
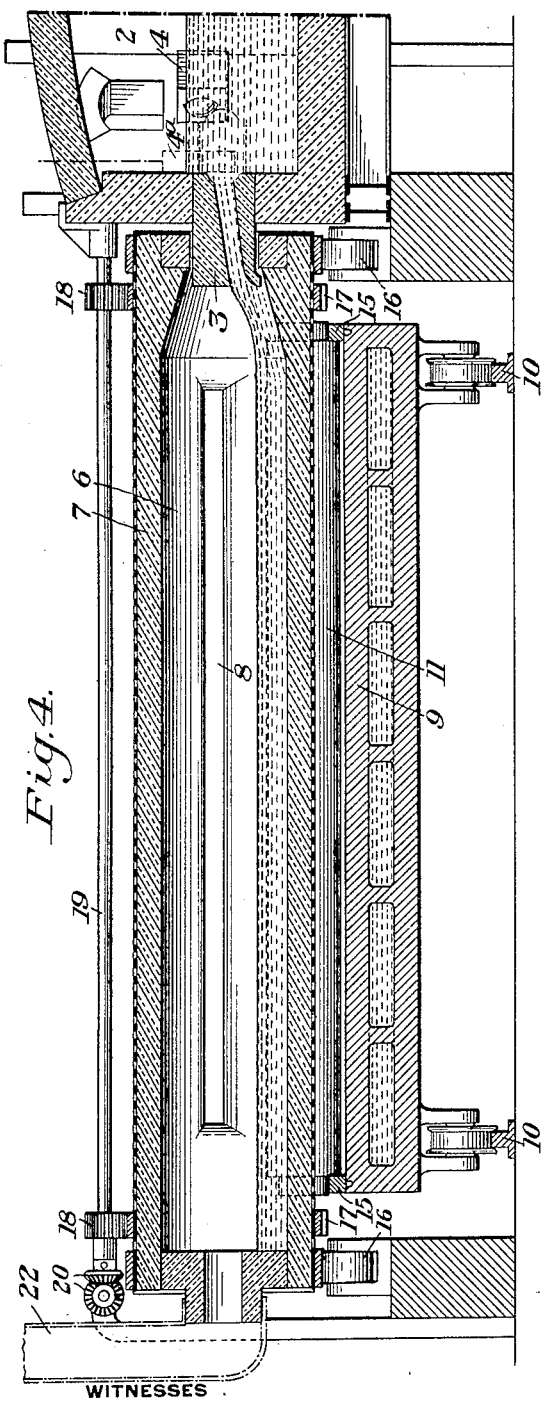
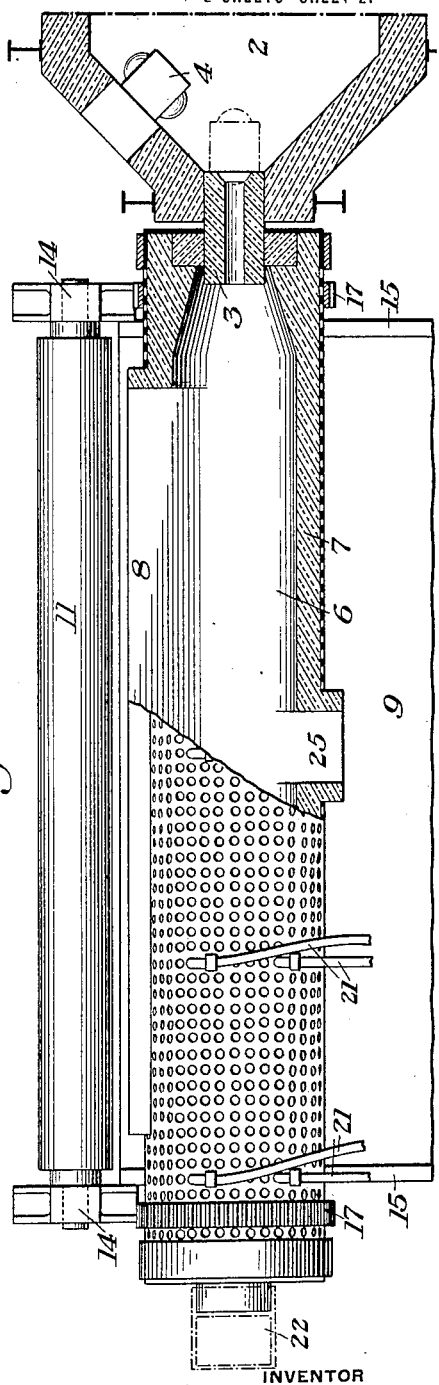

UNITED STATES PATENT OFFICE.

JOHN W. KUNZLER, OF PITTSBURGH, PENNSYLVANIA.

METHOD OF CASTING PLATE-GLASS AND APPARATUS THEREFOR.

1,396,330. Specification of Letters Patent. Patented Nov. 8, 1921.

Application filed April 19, 1917, Serial No. 163,134. Renewed March 25, 1921. Serial No. 455,436.

*To all whom it may concern:*

Be it known that I, JOHN W. KUNZLER, a citizen of the United States, residing at Pittsburgh, Allegheny county, Pennsylvania, have invented a new and useful Improvement in Methods of Casting Plate-Glass and Apparatus Therefor, of which the following is a full, clear, and exact description, reference being had to the accompanying drawings, forming part of this specification, in which—

Figure 1 is a plan view somewhat diagrammatic of one form of apparatus for carrying out my invention.

Fig. 2 is a sectional view on the line II—II of Fig. 1.

Fig. 3 is a view similar to Fig. 2 showing a portion of an apparatus of modified form.

Fig. 4 is a sectional view on the line IV—IV of Fig. 1, and

Fig. 5 is a plan view partially in section of the device shown in Fig. 4.

My invention has relation to the method of casting plate glass and apparatus therefor, and is designed to provide a simple and efficient method and apparatus of this character which will deliver the glass to the casting table free from bubbles and seeds, as well as in a manner to eliminate to a maximum extent all disturbances of the molten glass after being poured on the table, thereby enabling the manufacture of clean, clear glass.

My invention also provides a method and apparatus of this character by which a great saving may be effected in the cost of labor required, as well as in the attachments usually employed, such as pots, stoppers, fuel, etc.

Another object of my invention is to provide a method and apparatus in which there is a continuous flow of glass from a melting tank, which glass is obtained from a point below the upper surface thereof, so that the cleanest glass from the furnace will always be available for the manufacture of plate glass, as no surface glass will pass to the casting table.

Another object of my invention is to provide means whereby the glass can always be maintained at the proper temperature for pouring.

Still another object of my invention is to provide means in method and apparatus for casting plate glass, in which there is no danger of carrying off the lighter particles of the charge, so that the proper mix of material will always be obtained.

Still another object of my invention is to overcome the old form of teeming in which the glass is teemed or poured on the table in advance of the roll, and in a line parallel to the axis of the roll, by which teeming action overlapping of the glass frequently occurred so that a considerable portion of a large sheet was damaged.

The nature of my invention will be best understood by reference to the accompanying drawings, in which I have shown the preferred embodiment thereof, and which will now be described, it being premised, however, that various changes may be made in the details of construction, arrangement and combination of the several parts, without departing from the spirit and scope of my invention as defined in the appended claims.

In the drawings the reference character 2 designates the end of a melting tank, which may be of any usual or suitable type of construction. In accordance with my invention, I provide the delivery opening of the furnace with a refractory pouring sleeve 3, which is adapted to be closed by means of a stopper 4 or a sliding block $4^a$ shown in dotted lines in Fig. 4, when it is desired to stop the flow of glass.

The numeral 6 designates a glass receiving and casting vessel, which is preferably of cylindrical form, and consists of an outer metal shell which may be perforated, if desired, and an inner refractory lining 7. One end portion of this receptacle is provided with an opening which surrounds the projecting outer end portion of the pouring sleeve 3, the opening through said sleeve being of sufficient size to permit a predetermined amount of glass to flow from the furnace 2 to the casting vessel 6 in a predetermined length of time to make one cast.

The opening through the sleeve 3 is inclined downwardly, while the entrance end of the shell 6 is tapered, so that the minimum fall of glass from the spout to the casting device will be obtained, which will avoid forming bubbles and seeds in the glass while passing from the furnace to the casting device.

This receptacle is provided with a long casting opening 8, the length of which is slightly less than the width of the casting table 9 which is shown immediately below it.

The casting table 9 is movably mounted on rails 10, which rails extend beneath a roller 11 which is arranged to coöperate with the table, and the rails also extend to a point adjacent to a leer 12.

The table 9 is arranged to be moved toward the leer and back under the casting device by means of cables such as shown at 13 for the purpose hereinafter described. The roller 11 is rotatably mounted in fixed standards 14 on each side of the rails 10, the bearings therefor being arranged to permit the roller to move vertically, in order to roll glass of different thicknesses, which thickness is determined by means of edge strips 15, connected to the edges of the table 9.

The casting device 6 is supported on anti-friction rollers 16 at each end thereof, and connected to each end of this casting device is a circular rack 17, each of which is engaged by means of a pinion 18 on a shaft 19. This shaft 19 is arranged to be rotated at predetermined intervals by means of gearing 20.

21 are gas burners which extend into the casting apparatus and which are arranged to maintain the interior thereof and the metal therein at the proper temperature for casting, and 22 designates an offtake from the end of the casting device opposite the end surrounding the sleeve from the furnace. Placed adjacent to the mouth of the casting opening 8 of the casting device is a gas burner pipe 23, from which a series of jets may be directed into the open mouth thereof, in order to prevent the glass from remaining in the casting opening after the vessel has been returned to its normal position, and 24 designates a movable block which is arranged to close the casting or pouring opening 8 when desired. The other side of the furnace is also provided with a short tap-out opening 25 which I have shown closed by means of a tile 26, and which opening may be used for draining the furnace when desired, or draining out a predetermined amount of molten glass for making cullet.

The operation of the foregoing apparatus is as follows: Assuming the opening through the tile 3 to be the proper size to deliver sufficient glass to the casting apparatus for making a cast every fifteen minutes, the casting device 6 will be rotated in the direction indicated by the arrow in Fig. 3 to pour the glass onto the table across the greater portion of the width thereof. As soon as the pouring has started the table is moved to the left in the direction indicated by the arrow at the proper speed during the rotation of the casting device, so that the glass will be spread in the form of a sheet over the major portion of the table. After the proper amount of glass has been poured onto the table, the casting vessel is returned to the position shown in Fig. 2, which occurs just before the end of the table passes beneath the pouring opening, so that if there are any streamers from the pouring opening they will be on the end of the table. After the vessel has been returned to the position shown in Fig. 2, the burner 23 may be set into action in order to cause the glass to flow back into the casting vessel.

During the movement of the table toward the leer the roller 11 will first engage the inclined portion of the strips 9, and be raised the proper distance above the table to roll the glass the thickness determined upon, and during the movement of the table under the roller the entire sheet will be rolled. The table then passes to a point beyond the roller and up to the leer, and after the glass has cooled to the proper point the sheet is moved from the table into the leer in the usual way. The table is then cleaned in the usual manner and is returned to the position under the casting apparatus for the next cast.

In Figs. 1, 2, 4 and 5 I have shown the roller 11 adjacent to the casting apparatus, but it will readily be understood by those familiar with the art that, if desired, this roller may be remote from the casting apparatus.

In Fig. 3 I have shown a device somewhat similar to that shown in the other figures, but in this case the casting apparatus is rotated in the reverse manner to pour the molten metal toward the roller and in a direction coincident with the movement of the table. In this figure I have also shown the roller carried by the table in the usual manner, and which can be moved to a predetermined point together with the table, and afterward rolled over the glass, as is done in the usual practice today.

In this figure I have designated all of the parts with the same reference characters, with the letter "a" affixed.

The advantages of my invention result from the provision of a method and apparatus for casting plate glass in which the casting apparatus is very nearly as long or longer than the width of the casting table, so that the pool of glass therein for each cast will be very shallow in proportion to the length thereof. Also from the provision of a casting apparatus having an opening therein of sufficient length to pour the metal onto the table without moving the table or the pouring apparatus laterally with relation thereto, so that the table can be moved longitudinally with reference to the casting apparatus to permit pouring the glass in the form of a sheet over the table in advance of the roller, and thereby avoid the spreading of the glass by hand, which will obviate the overlapping of the glass during the rolling action.

Furthermore, from the provision of means for maintaining the glass in the casting apparatus at the proper temperature, as well as means for supplying molten glass to the casting apparatus in a continuous manner from a point below the upper surface of the glass. By permitting the glass to flow in a continuous manner from the furnace to the casting apparatus, I am enabled to overcome the overlapping of glass, and consequently the formation of seeds and bubbles caused thereby.

This application forms a continuation in part of my application Serial No. 110,632, filed July 22, 1916.

I claim:

1. In an apparatus of the character described, the combination with a melting tank or furnace having a delivery opening, a refractory delivery spout or sleeve seated in said opening and projecting beyond the face of the wall of the furnace, the upper edge of the opening through the spout being below the normal level of the glass in the furnace, of a rotary receptacle surrounding the projecting portion of said sleeve and having a casting or delivering opening, and means for heating the glass in said receptacle other than the heat from the furnace, whereby the temperature of the molten glass therein may be controlled; substantially as described.

2. A plate glass casting apparatus, comprising a longitudinally extending tiltable vessel constructed and arranged to receive and hold the molten glass to be cast in a shallow pool whose length is greater than the width of the plate to be cast, said vessel having a delivery opening in its side wall above the normal level of the glass therein, said vessel also having an inlet opening communicating therewith and with a melting tank or furnace; substantially as described.

3. A plate glass casting apparatus, comprising a casting table, a longitudinally extending tiltable vessel constructed and arranged to receive and hold the molten glass to be cast in a shallow pool whose length is greater than the width of the casting table, said vessel having a delivery opening in its side wall above the normal level of the glass therein, and said vessel also having an inlet opening communicating therewith and with a melting tank or furnace; substantially as described.

4. In an apparatus of the character described, the combination with a melting tank or furnace having a delivery opening, and a refractory delivering spout or sleeve seated in said opening and projecting beyond the wall of the furnace, of a rotary receptacle surrounding the projecting portion of said sleeve, a casting table movably mounted below said rotary receptacle, said rotary receptacle having a casting opening of a length equal to the width of the metal desired to be placed on the table, a long burner located in front of the casting opening when the receptacle is in its elevated position and which is arranged to heat said opening between pours, and means for moving the table under the receptacle during the pouring to spread the glass in a longitudinal direction over the table; substantially as described.

5. In an apparatus of the character described, the combination with a melting tank or furnace, and a rotatable receptacle, a delivery spout connected to the furnace and extending into the rotatable receptacle, there being a downwardly extending opening through said delivery spout, the upper edge thereof being below the normal upper level of the glass in the furnace and communicating with the interior of the receptacle, the cross sectional area of said opening being such that the glass is permitted to flow continuously from the furnace to the receptacle during the casting and between the various casts, the receptacle having a conical wall which extends from the mouth toward the delivery spout, the arrangement being such that the molten glass will have a gradual fall from the mouth of the spout to the receptacle regardless of the position to which the receptacle is rotated, and a casting table located below the receptacle; substantially as described.

6. A plate glass casting apparatus, comprising a longitudinally extending tiltable furnace constructed and arranged to receive and hold molten glass to be cast in a shallow pool whose length is nearly as great or greater than the width of the plate to be cast, said vessel having a delivery opening in its side wall of a length equal to the width of the supply of molten glass to be placed on the table, a movable table below said tiltable vessel, a roller arranged to coact therewith, and means to move said table at right anges to the axis of the roll and the axis of the tiltable furnace during the casting operation; substantially as described.

7. The method of casting plate glass, comprising the steps of continuously feeding molten glass into a tiltable vessel, periodically tilting said vessel to pour the molten glass therein onto a casting table across the face thereof, and during such pouring operation moving the table in a direction at right angles to the axis of the vessel to spread the glass in the form of a sheet on the table and during such movement moving the table and glass under a sheet-forming roller to roll the glass to the required thickness; substantially as described.

In testimony whereof, I have hereunto set my hand.

JOHN W. KUNZLER.